US009726243B2

(12) United States Patent
Radhakrishnan et al.

(10) Patent No.: US 9,726,243 B2
(45) Date of Patent: Aug. 8, 2017

(54) DISC BRAKE PAD RETENTION SYSTEM AND MOUNTING METHOD

(71) Applicant: Bendix Spicer Foundation Brake LLC, Elyria, OH (US)

(72) Inventors: Harish Radhakrishnan, Westlake, OH (US); Richard L. Lantz, Clinton, OH (US); Kailin Deng, Elyria, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 130 days.

(21) Appl. No.: 14/664,067

(22) Filed: Mar. 20, 2015

(65) Prior Publication Data

US 2016/0273600 A1     Sep. 22, 2016

(51) Int. Cl.

| F16D 65/40 | (2006.01) |
|---|---|
| F16D 65/097 | (2006.01) |
| F16D 55/225 | (2006.01) |
| F16D 65/00 | (2006.01) |
| F16D 65/092 | (2006.01) |
| F16D 69/00 | (2006.01) |

(52) U.S. Cl.
CPC ....... F16D 65/0977 (2013.01); F16D 55/225 (2013.01); F16D 65/0006 (2013.01); F16D 65/092 (2013.01); F16D 69/00 (2013.01)

(58) Field of Classification Search
CPC ...... F16D 55/00; F16D 55/225; F16D 55/226; F16D 55/227; F16D 65/006; F16D 65/092; F16D 65/0972; F16D 65/0977; F16D 65/0006; F16D 69/00
See application file for complete search history.

(56) References Cited

U.S. PATENT DOCUMENTS

| 3,768,605 A | 10/1973 | Carre |
|---|---|---|
| 8,540,061 B1 * | 9/2013 | Plantan ............... F16D 55/226 188/250 B |
| D712,809 S * | 9/2014 | Kloos ...................... D12/180 |
| 2002/0029942 A1 * | 3/2002 | Miyata .................. F16D 55/00 188/73.31 |
| 2004/0026188 A1 | 2/2004 | Emmett et al. |

(Continued)

FOREIGN PATENT DOCUMENTS

DE     40 32 886 A1     4/1992

OTHER PUBLICATIONS

International Search Report (PCT/ISA/220 & PCT/ISA/210) issued in PCT Application No. PCT/US2016/023002 dated Jun. 3, 2016 (three pages).

(Continued)

*Primary Examiner* — Pamela Rodriguez
(74) *Attorney, Agent, or Firm* — Crowell & Moring LLP (57) ABSTRACT

An apparatus and method are provided for suppressing undesired brake pad motion during brake application, and for installing and removing brake pads utilizing the inventive arrangements. One embodiment of the invention includes brake pads and a carrier mount having complementary surface features that retain the brake pad when the brake pad is in its installed position and a brake pad biasing structure that biases the brake pad in the radially outward direction to bias contact faces of the mount horn and the brake pad against one another to suppress brake pad kick and vibration and related wear and component fatigue.

11 Claims, 10 Drawing Sheets

(56) References Cited

U.S. PATENT DOCUMENTS

| | | | |
|---|---|---|---|
| 2004/0168868 A1* | 9/2004 | Thomas | F16D 65/0977 |
| | | | 188/73.37 |
| 2008/0067015 A1* | 3/2008 | Thomas | F16D 55/00 |
| | | | 188/73.31 |
| 2009/0277729 A1* | 11/2009 | Kim | F16D 65/0972 |
| | | | 188/73.38 |
| 2009/0283372 A1 | 11/2009 | Matsushima | |
| 2012/0085597 A1* | 4/2012 | Narayanan | F16D 55/227 |
| | | | 188/72.1 |
| 2014/0345983 A1 | 11/2014 | Baumgartner et al. | |

OTHER PUBLICATIONS

Written Opinion (PCT/ISA/237) issued in PCT Application No. PCT/US2016/023002 dated Jun. 3, 2016 (five pages).

* cited by examiner

FIG. 13

DISC BRAKE PAD RETENTION SYSTEM AND MOUNTING METHOD

BACKGROUND AND SUMMARY OF THE INVENTION

The present invention relates to disc brakes for vehicles, and in particular to a system and method for mounting, removing and retaining brake pads in disc brakes, such as air-operated disc brakes utilized on commercial vehicles.

Pneumatically-operated disc brakes have been undergoing development and deployment on commercial vehicles since at least the 1970's, and are beginning to replace drum-style brakes due to advantages in areas such as cooling, fade resistance and serviceability. German Patent Publication No. DE 40 32 886 A1, and in particular FIG. 1 of this document, discloses an example of such an air disc brake. In this design, a pneumatic diaphragm chamber (pneumatic actuator) is attached to a rear face of the disc brake caliper housing, and applies a brake actuation force through a linear actuator rod to a brake actuator lever within the caliper. The brake's actuator lever in turn transfers and multiplies the force applied by the actuator rod to one or more spindles, which force brake pads against a brake disc or rotor. The terms "brake disc," "rotor" and "brake rotor" are used interchangeably herein.

In applications such as commercial vehicles, wheel rims have historically been sized to only provide adequate clearance for the drum-type brakes historically employed on such vehicles. Because the resulting space envelope between the wheel and its axle is limited, the outer radius of the brake caliper, brake pads and any brake pad retention devices must conform to the limited available radial space. Brake pads typically have been located and retained on one of the brake caliper or brake caliper carrier/mount using transverse suspension pins and/or using leaf spring-type metal strips disposed over the outer radius of the brake pads. Brake pads have also been retained by capturing the brake pads between the caliper mounting frame and the portion of the brake caliper which straddles the brake disk. As one of ordinary skill will recognize, the same brake pad support function may be provided by a brake caliper carrier/mount designed to support the brake pads or by a brake pad carrier which is separate from the caliper mounting structure. For convenience in this description, the terms caliper carrier, caliper mount and brake pad carrier may be interchanged without intending to limit the brake pad supporting structure to any specific brake pad and brake caliper carrying structure.

Figure 13:
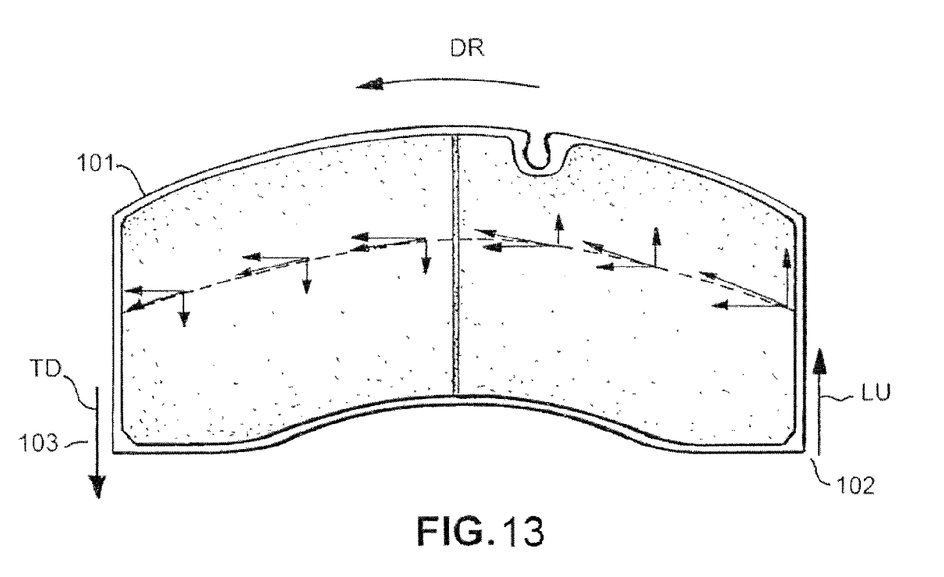
FIG. 13 is a force diagram of forces acting on a brake pad during brake operation.

A problem with the previous brake pad retention approaches is their tendency to allow the brake pad to rotate about an axis parallel to the brake disc rotation axis during brake application. This in-place rotation is referred to as "pad kick," a motion that can generate undesired brake application noise due to brake pad vibrations, increase fatigue damage to the typical over-pad leaf spring retainer, and increase wear and damage to the brake pad and/or brake caliper mounting structure. An illustration of pad kick is provided in FIG. 13. When a brake pad 101 is applied against a friction surface of a brake disk (not illustrated) which is rotating in direction DR, the brake disk's rotation induces motion and reaction forces between the brake pad 101 and its adjacent mount abutment surfaces (not illustrated). At the leading edge 102 of the brake pad the brake pad attempts to move upward in direction LU in response to the friction forces along the face of the brake pad (illustrated here by force arrows across the face of brake pad 101). At the trailing edge 103 of the brake pad, the brake pad attempts to move downward in direction TD. However, because the brake pad 101 is constrained by adjacent mount abutment surfaces, the overall motion of the brake pad is generally a rotation about an axis parallel to the brake disk rotation axis. This motion may be unilateral during the brake application, or may manifesting itself as a moderate-to-severe oscillation of the brake pad in its mount, significantly increasing wear of the abutting brake pad and mount surfaces.

The present invention addresses these and other problems by providing a brake pad mounting and retention arrangement and method of installation and removal which provides increased brake pad retention and guidance, decreased pad kick and vibrations, and decreased component wear and fatigue.

In one embodiment of the present invention the brake pad is pulled upward (i.e., radially outward) by a spring reaction bar and springs over each brake pad to bias the surface features at the lateral sides of the brake pad against the undersides (i.e., radially inner sides) of corresponding surface features of the mount structure carrying the brake caliper and/or brake pads.

In a preferred embodiment the mount structure's brake pad abutments (also known as "mount horns") have a large wedge-shaped or gear tooth-shaped surface facing the adjacent lateral side of the brake pad, and the brake pad has a corresponding indentation. As the spring reaction bar and springs pull upward on the brake pad, the lower surface of the pad abutment's wedge-shaped surface and the corresponding upward-facing surface of the lateral side of the brake pad cooperate to provide a broad pad contact surface area. This biasing configuration substantially suppresses pad kick and vibrations during brake application.

Further preferably, the brake pad and mount structure are configured in a manner such as that shown in U.S. Pat. No. 8,540,061, in which the brake pad and the mount abutments cooperate to allow vertical insertion (i.e., in the radially inward direction) of the brake pad into the mount at a portion of the mount abutment farthest from the brake disc, followed by translation of the brake pad in the axial direction toward the brake disc to advance the lateral surface features of the brake pad and the mount abutment into engagement with one another.

The structure that pulls the installed brake pad upward may include a spring reaction bar that is configured to be removably fixed to the brake caliper, with one or more spring that are supported on the spring reaction bar and engaging features on the upper (i.e., radially outer) surface of the brake pad backing plate to bias the brake pad upwards.

In one embodiment, the spring reaction bar may be a bar with a first end that is received by the brake caliper, such as by sliding into a corresponding slot at or near the opening in the brake caliper through which the brake pads may be inserted or removed without removal of the brake caliper from its mount. The second end of the spring reaction bar may be configured to be captured at the opposite side of the pad insertion opening, for example, by having a slot through which a tab of the brake caliper can protrude to receive a retaining pin. The spring reaction bar may also be configured with portions of multiple radial heights, for example a radially high center portion to provide additional clearance between the bar and the outer radius of the brake disc, and radially lower side portions that are configured to be located in corresponding lateral guidance grooves at the upper surface of the brake pad backing plate.

The springs that cooperate with the spring reaction bar may be leaf springs that are positioned above (radially outward of) the spring reaction bar and provided with lateral spring ends that positively engage corresponding spring-receiving features at the upper surface of the brake pad backing plate and draw the brake pad upwards to bias the wedge-shaped surfaces of the brake pad and the pad abutments against one another. Preferably the springs are preformed such that they may be pressed downward (radially inward) onto the upper surface of the brake pad backing plate and elastically deform to cause the tips of the springs to slide along the top surface of the brake pad backing plate and into receiving slots of the brake pad backing plate. In this embodiment, the tips of the leaf springs are formed in an S-shape, with the height of the S-shape being such that the tips are held by friction in the backing plate receiving slots.

A further embodiment of the present invention includes additional elements that may be inserted between the radially outer surface of the spring retaining bar and the radially inner surfaces of the leaf springs to increase the biasing forces applied in the radially outward direction by the leaf springs to their brake pads.

As an alternative to forming the tips of the leaf springs in an S-shape, the tips of the leaf springs may be provided with features such as a hole configured to engage corresponding features such as hooks on the brake pad backing plate to ensure positive engagement between the springs and the brake pad.

Other brake pad backing plate and spring arrangements are possible within the scope of the present invention, such as springs mounted to the underside of the spring retaining bar, use of more than one spring retaining bar cooperating with one or more spring segments, or spring tips with different shapes, as long as the structure biases the brake pad upward against the laterally-projecting mount horn pad abutment features.

A method of assembly of an embodiment of the present invention includes withdrawing the brake caliper actuator (for example, brake application spindles) a sufficient distance to allow insertion of the brake pads, vertically (i.e., in the radially inward direction) inserting a brake pad through the brake caliper's brake pad insertion opening until the lateral surface features of the brake pad are aligned with the corresponding mount horn abutment features, advancing the brake pad toward the brake disc to engage the corresponding lateral surface features, installing the spring reaction bar across the brake pad insertion opening, placing the spring over the spring retaining bar and pressing downward (radially inward) on the spring until the lateral tips of the spring engage the spring receiving slots on the upper surface of the brake pad backing plate. Removal of the brake pads may be accomplished by reversing the installation method, either with or without tools as necessary to disengage the spring tips from the brake pad backing plate.

Another embodiment of the method would include placing the brake pads in the mount prior to locating the brake caliper on its mount. The remaining component installation would be similar to the above.

Other objects, advantages and novel features of the present invention will become apparent from the following detailed description of the invention when considered in conjunction with the accompanying drawings.

DETAILED DESCRIPTION OF THE DRAWINGS

Figure 1:
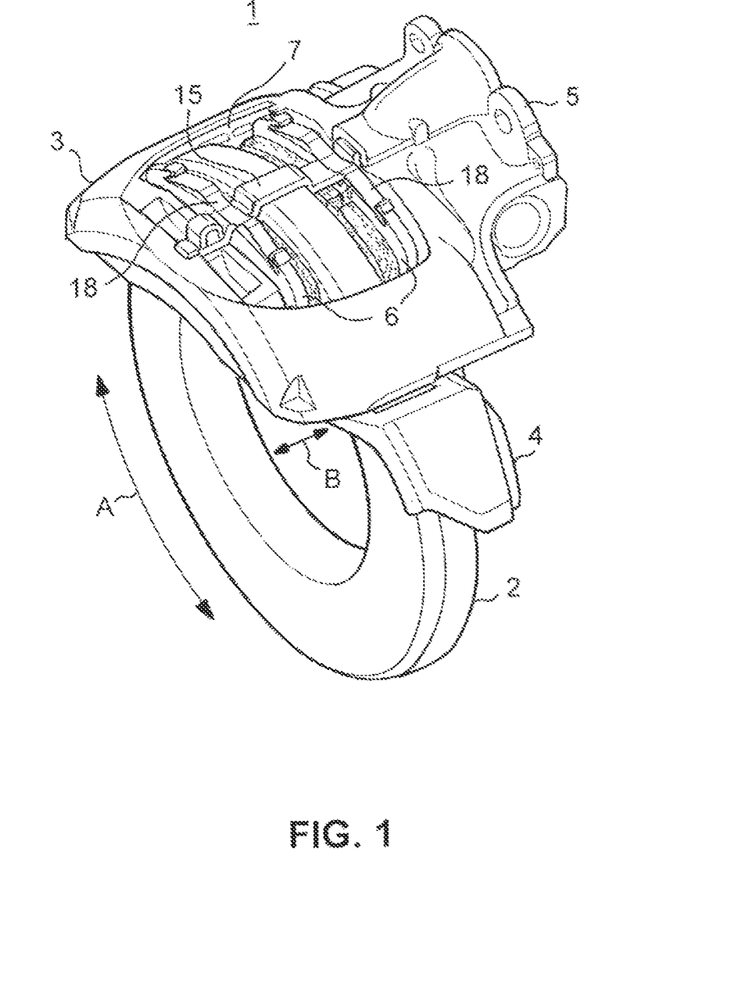
FIG. 1 is an oblique view of a disc brake in accordance with an embodiment of the present invention.

In the embodiment shown FIG. 1, a disc brake 1 of a commercial vehicle includes a brake disk 2, a brake caliper 3 straddling the brake disk 2. The caliper 3 is affixed to a carrier mount 4 which in turn is fixed to a vehicle axle, typically via a torque plate or a brake spider (not illustrated). The caliper 3 is actuated by an actuator (not illustrated) mounted at the actuator mounting face 5 of the brake caliper 3. The actuator acts upon a brake pad application mechanism contained within caliper 3 to press brake pads 6 against the brake disk 2 to slow the vehicle. The present invention is not restricted to a particular type of brake actuator, for example, a pneumatic actuator or an electrically-driven actuator may be used. Nor is the invention limited to a particular type of brake caliper mount arrangement. For example, the brake caliper may be mounted in a fixed manner on a carrier or may be a sliding caliper.

In this embodiment the caliper 3 is provided with an aperture 7 which is wide enough in the circumferential direction A and the axial direction B to permit the brake pads 6 to be withdrawn and inserted without removal of the caliper 3 from the carrier mount 4.

Figure 2:
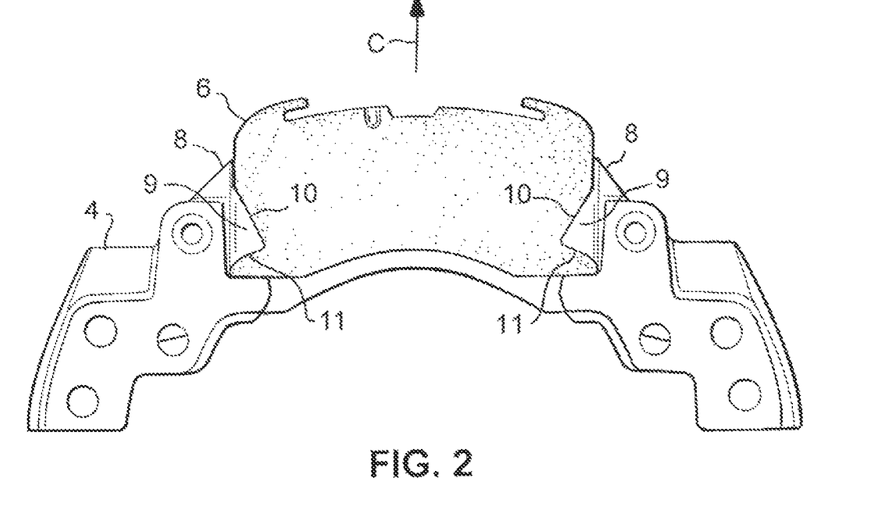
FIG. 2 is an elevation view of the caliper mounting carrier and brake pad of FIG. 1.

FIG. 2 is an elevation view of the caliper mounting carrier 4 and brake pad 6 of FIG. 1, showing mount horns 8 with brake pad abutment surface features 9 that are wedge-shaped and extend laterally toward the adjacent lateral sides of the brake pad 6. The brake pad 6 includes corresponding recessed surface features 10 arranged to cooperate with the abutment surface wedges at surface faces 11 to retain the brake pad 6 in the carrier mount 4 against movement in the radially outward direction C. The present invention is not limited to this single arrangement of mount horn and brake pad shapes. For example, the mount horn surface features may have multiple surfaces arranged to engage the brake pad or may have gear teeth-like shapes, as long as the mount horn surface features provide an adequate bearing surface to support the upward bias applied to the brake pad and the forces and wear associated with pad kick during brake operation.

Figure 3:
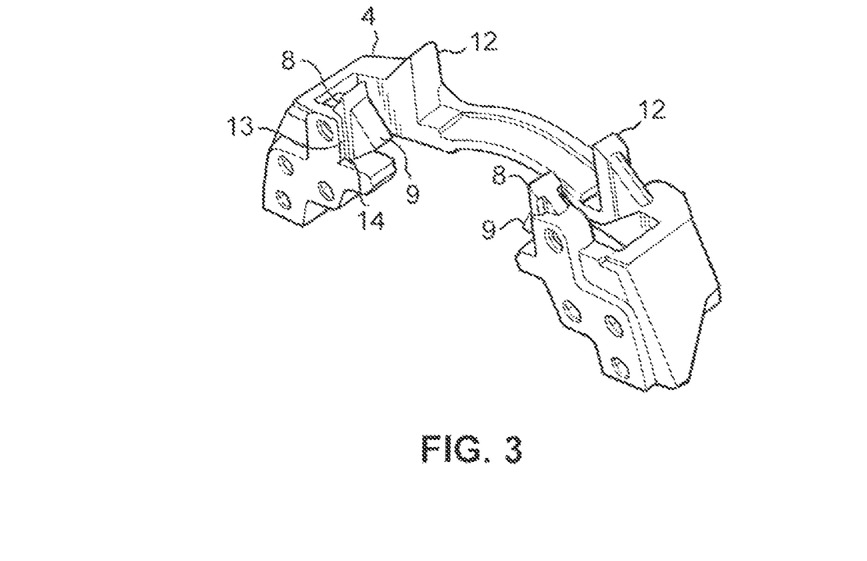
FIG. 3 is an oblique view of the caliper mounting carrier in FIG. 2.

The oblique view of the carrier mount 4 in FIG. 3 shows on one side of the mount typical prior art mount horns 12 having flat, featureless faces against which the lateral edges of a brake pad abut. On the other side of the mount 4 are shown the present invention's mount horns 8 and wedge-shaped surface features 9 protruding toward one another. Also illustrated are a vertical groove 13 on a side of the mount horn 8 facing away from the brake disc 2 (not illustrated here for clarity) and a transverse groove 14 at the base of the mount horn 8. These grooves enable an appropriately configured brake pad to be inserted into the disc brake with the guidance of the vertical groove 13, and then advanced toward the brake disc guided by the transverse groove 14.

Figure 4:
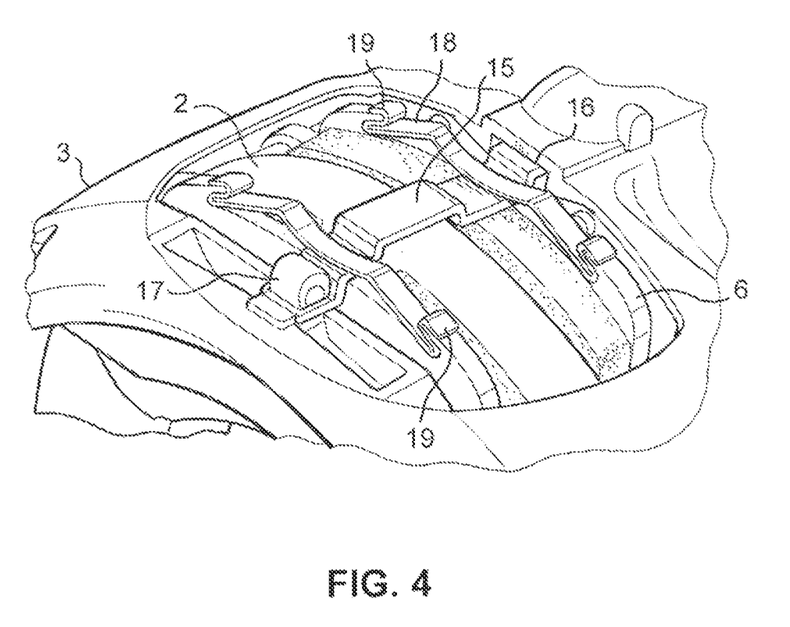
FIG. 4 is a closer oblique view of the spring retaining bar and springs of FIG. 1.

FIG. 4 shows the spring retaining bar and spring arrangements of the FIG. 1 embodiment. In this embodiment the spring reaction bar 15 has a first end that is inserted into a slot 16 on the actuator side of the brake caliper 3. The opposite end of the spring reaction bar 15 includes a slot that is sized to fit over a retaining tab 17 of the brake caliper 3. The retaining tab 17 includes a cross-bore that received a retaining device such as a cross pin to prevent separation of the spring reaction bar 15 from the brake caliper 3.

In this embodiment two springs 18 are positioned over the top (radially outer) surface of the spring reaction bar 15. The tips 19 of the springs 18 are formed with an S-shape that engages within and over corresponding spring receiving slots on the upper surface of the backing plate of the brake pad 6.

Figure 5:
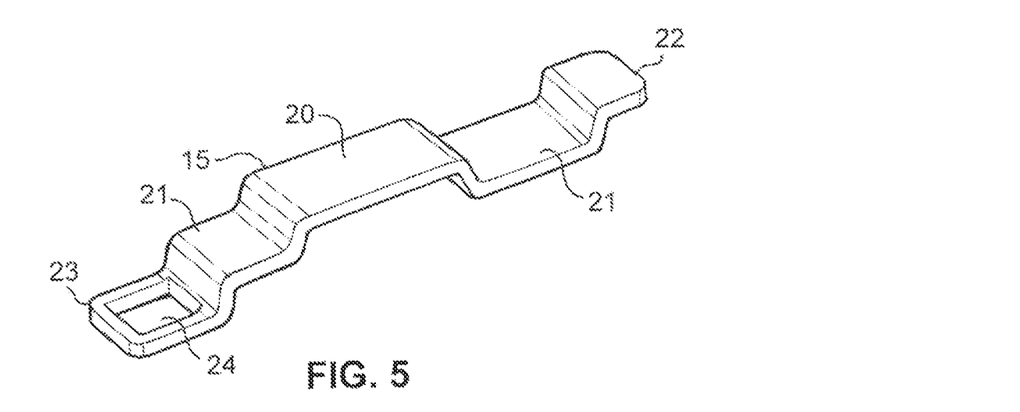
FIG. 5 is an oblique view of the spring retaining bar of FIG. 1.

This embodiment of the spring retaining bar is shown in greater detail in FIG. 5. The spring reaction bar 15 has a raised portion 20 that provides additional clearance over the brake disc 2, as well as lower portions 21 that receive the springs 18 when installed in the brake. A first end 22 of the bar 15 is shaped to be received into the brake caliper slot 16, while the opposite end 23 includes the slot 24 through which the caliper tab 17 passes. The height of the lower portions 21 relative to the top of the brake pad 6 may be set as necessary to obtain a desired level of radially-outward biasing force, including being high enough to be level with the raised portion 20 that passes over the brake disc or above the raise portion 20 (i.e., concave upward instead of the concave downward arrangement of the portions 21 shown in FIG. 5).

Figure 6:
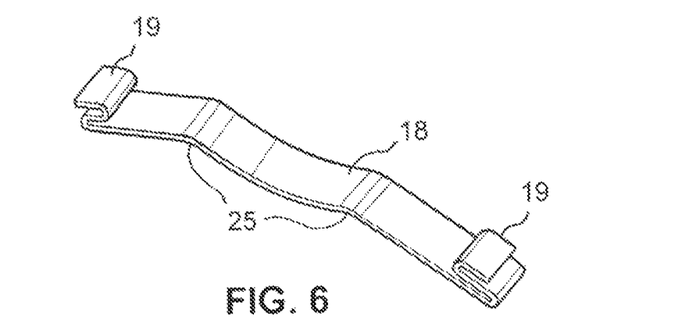
FIG. 6 is an oblique view of the spring of FIG. 1.

FIG. 6 is an oblique view of the spring 18 of FIG. 1. This spring is preferably formed from an elastic material such as a spring steel. The S-shaped tips 19 lay outboard of bends 25 provided in this embodiment to facilitate installation of the spring 15. During spring installation the tips 19 are snapped into their corresponding slots in the upper surface of the brake pad 6. The bends 25 provide for controlled elastic bending of the spring 15 to reduce the spring length until the tips 19 pass around the inner ends of the backing plate slots and the spring expands to seat against the opposing slots. Once installed, the springs 15 are elastically preloaded against the upper surface of the spring reaction bar 15, such that the spring and spring reaction bar arrangement biases the brake pad 6 upward to place the surface features 9, 10 of the mount horn 8 and the brake pad 6 into contact with one another at surface faces 11 to suppress undesired brake pad motion.

Figure 7:
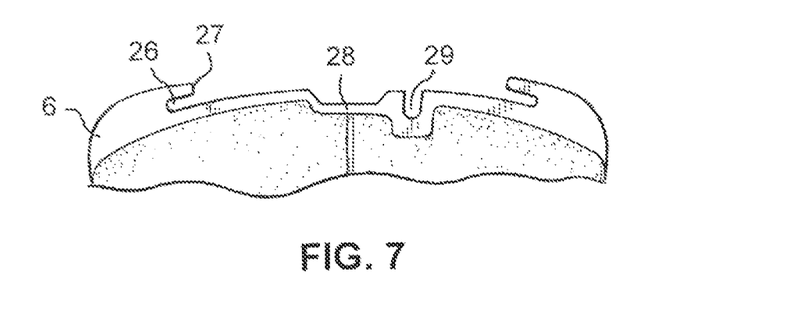
FIG. 7 is an elevation view of an upper surface of the brake pad of FIG. 1

FIG. 7 provides an elevation view of an upper surface of the brake pad 6 showing the upper surface spring receiving slots 26 and the inboard slot tips 27 over which the spring tips 19 must pass before the spring tips can enter the slots 26 when the spring is snapped into its installed position from above (i.e., in the radially inward direction. At the center of this embodiment of brake pad 6 a slot or notch 28 is provided over which the spring reaction bar 15 is located. This notch 28 may interact with the spring reaction bar 15 to further limit undesired brake pad motion. The brake pad may also include a slot 29 configured to receive a brake pad wear indicator sensor (not illustrated) in the space available adjacent to the spring reaction bar 15.

Figure 8A:
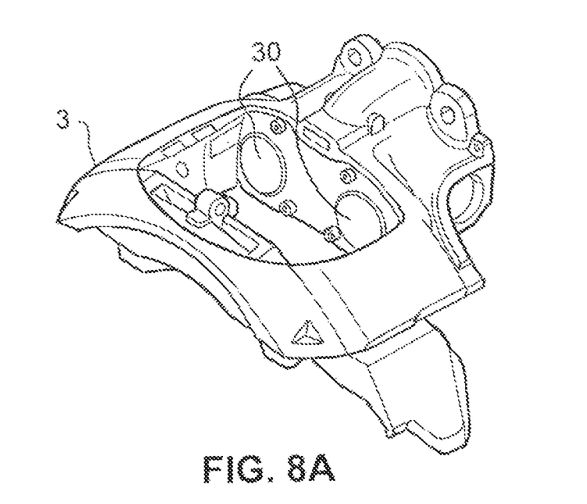
FIGS. 8A-8D illustrate operations during installation of brake pads in accordance with an embodiment of the present invention.
Figure 8B:
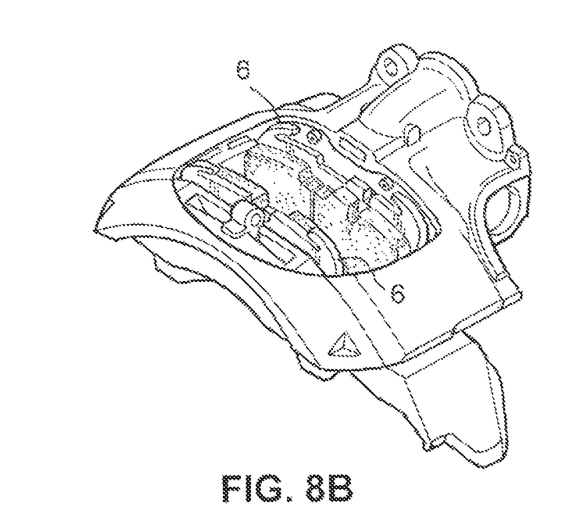

FIGS. 8A-8D illustrate operations during installation of brake pads in accordance with an embodiment of the present invention. As shown in FIG. 8A, in this embodiment the brake is readied for brake pad installation by withdrawing the brake application spindles 30 back a distance sufficient to allow the brake pads to be inserted between the brake disc 2 (not illustrated here) and the brake caliper 3. FIG. 8B shows the brake pads 6 in their installed positions, following vertical insertion into the brake at the outer sides of the pad insertion opening 7 of the brake caliper 3 (guided by vertical grooves 13) and axial advance into guide groove 14 toward the brake disc 2.

Figure 8C:
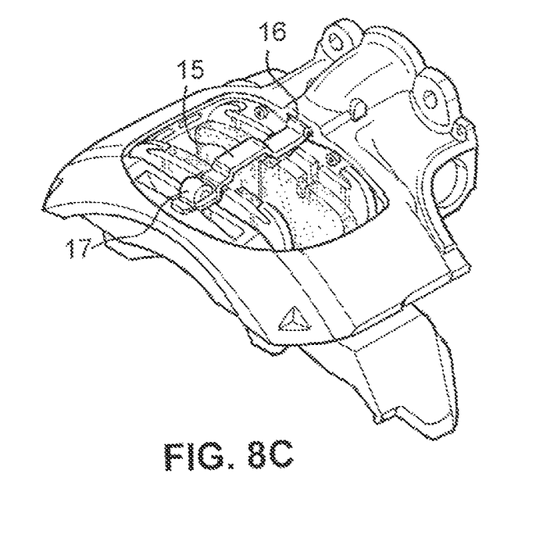
Figure 8D:
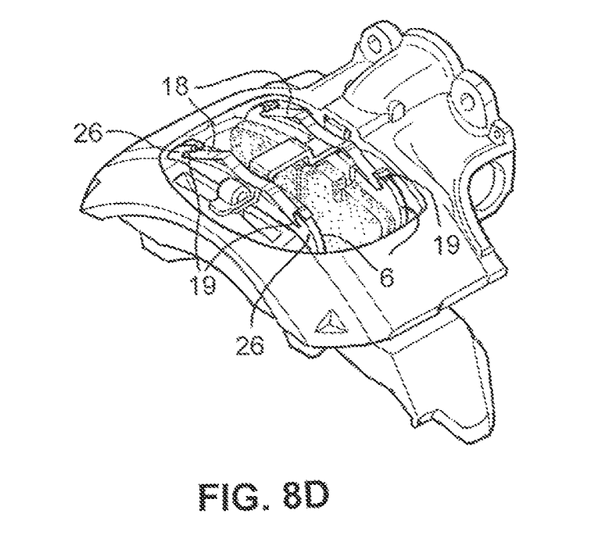

In FIG. 8C the spring reaction bar 15 has been inserted into caliper slot 16, placed over caliper tab 17 and secured by a bar securing cross-pin (not illustrated). Finally, FIG. 8D shows the springs 18 in place following the act of elastically deforming the springs to permit the insertion of the spring tips 19 into the corresponding brake pad backing plate spring receiving slots 26, thereby pulling the brake pad 6 upward (i.e., radially outward) to bias the mount horn and brake pad surface faces 11 against one another.

A further embodiment of the present invention is shown in FIGS. 9-12. In this embodiment insert elements 31, 31a are inserted between the radially outer surface of the spring retaining bar 15 and the radially inner surfaces of the leaf springs 18 to displace the center portions of the springs 18 radially outward than thereby increase the biasing forces applied in the radially outward direction to the brake pads 6 by the springs 18. For example, in this embodiment the insert element 31 is sized to provide on the order 200 N of force in the radially outward direction against the radially inner surface of the spring 18.

Figure 9:
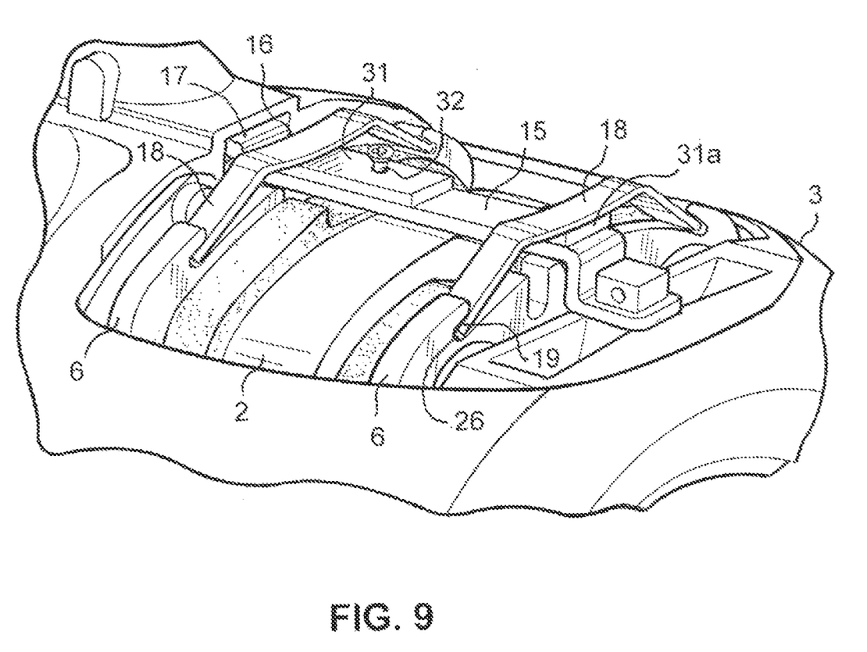
FIG. 9 is an partial oblique view of another embodiment of a disc brake in accordance with the present invention.

The insert elements 31, 31a that are "wedged" between the spring reaction bar 15 and the springs 18 may be positively secured to at least one of the springs and the spring reaction bar. In this embodiment the insert element 31 on the brake actuator side of the brake is secured by a fastener, specifically by screw 32, to the spring reaction bar 15.

Figure 10A:
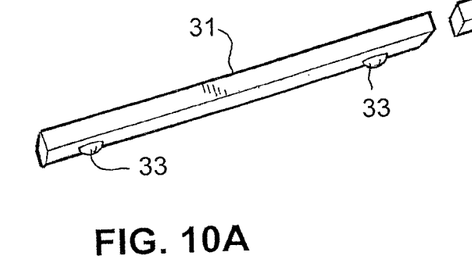
FIGS. 10A-10C are detailed oblique views of spring reaction components of the embodiment of FIG. 9.
Figure 10B:
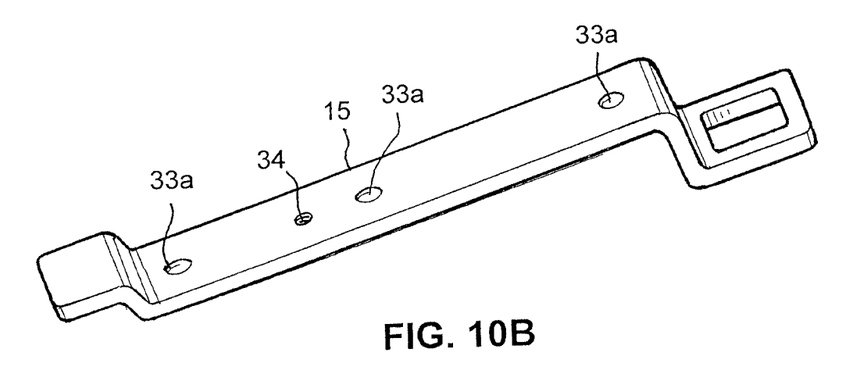
Figure 10C:
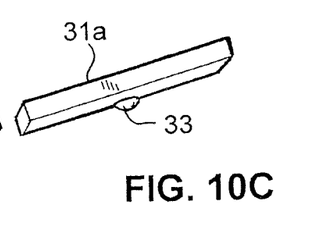

As shown in FIGS. 10A-10C, the insert elements may be guided and laterally constrained on the spring reaction bar 15 by surface features such as complementary convex and concave features 33. FIG. 10A shows the elongated insert element 31 at the brake actuator side of the brake having two surface features 33 that correspond to surface features 33 on the spring reaction bar 15 shown in FIG. 10B. These surface features 33 cooperate to resist rotation about fastener 32 when the fastener is installed into fastener receiving hole 34. In contrast, FIG. 10C shows the insert element 31a provided on the opposite side of the brake has a single complementary feature 33, which cooperates with the corresponding feature 33 on the spring reaction bar 15 shown in FIG. 10B. In this embodiment the single set of cooperating surface features at this end if the spring reaction bar 15 is sufficient to ensure that the insert element 31a does not migrate out of the space between the spring reaction bar 15 and its spring 18. The insert elements 31, 31a may be inserted before or after the springs 18 are placed over the spring reaction bar 15. For example, the inserts may be configured to allow their insertion between the spring 18 and bar 15 after the spring in installed (e.g., by sliding along the radially outer surface of the spring reaction bar 15, to increase the radially-outward biasing force being exerted by the spring 18 to the brake pad 6.

This embodiment of the present invention is not limited to a fastener that is inserted radially inward through the insert element 31 into the spring reaction bar 15. Any suitable insert element retaining arrangement may be used, such as a stud provided on the spring retaining bar that receives a nut installed over the insert element or a lateral clip arrangement, as long as the insert element 31 is constrained against motion that would result in disengagement of the insert element from the space between the spring reaction bar 15 and the spring 18.

Figure 11:
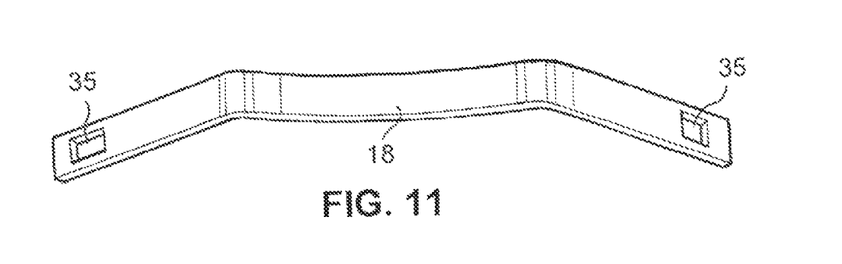
FIG. 11 is an oblique view of a leaf spring of the embodiment of FIG. 9.
Figure 12A:
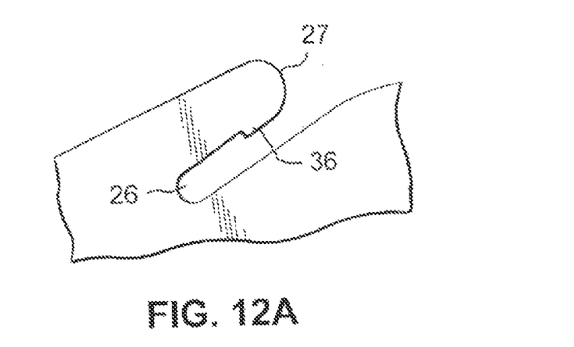
FIGS. 12A-12C are elevation views of portions of the brake pad of the embodiment of FIG. 9.

As an alternative to forming the tips of the leaf springs in an S-shape as in the FIG. 1 embodiment, as shown in FIG. 11 the tips of the leaf spring 18 may be provided with features such as depressions (in FIG. 12A, holes 35) configured to engage corresponding features such as hooks on the brake pad backing plate to ensure positive engagement between the springs and the brake pad. An example of such a hook is shown in FIG. 12A, where hook feature 36 is located within brake pad spring receiving slot 26, beneath the brake pad spring receiving slot tip 27.

Figure 12B:
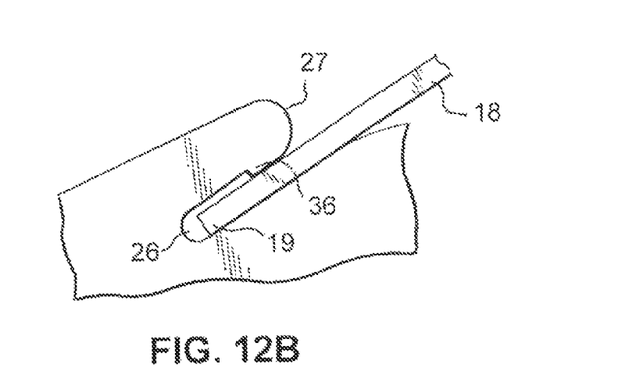
Figure 12C:
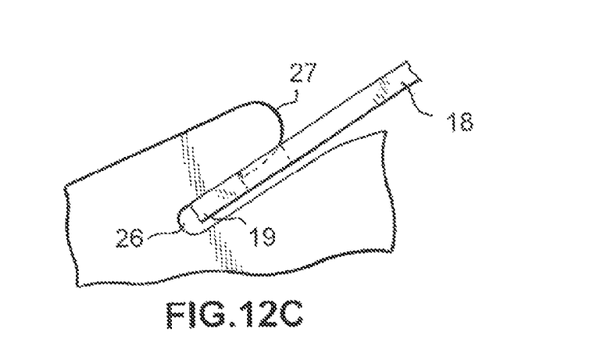

In this embodiment, the leaf spring 18 may be held by the brake pad 6, as shown in FIG. 12B, by inserting the spring tip 19 into the brake pad spring receiving slot 26 until the spring's hole 35 has aligned with the brake pad spring receiving slot hook feature 36. Then, as shown in FIG. 12C, the compression on spring 18 is released to allow the brake pad spring receiving slot tip 27 to engage in hole 35. Removal of the spring 18 would be the reverse operation, with the spring tip 19 being displaced into the position shown in FIG. 12B and held against the lower surface of the brake pad spring receiving slot 26 while being withdrawn from the slot.

The foregoing disclosure has been set forth merely to illustrate the invention and is not intended to be limiting. For example, the spring reaction bar may be replaced by another component or a portion of the brake caliper itself that provides the spring a base against which the spring can exert its radially outward brake pad biasing force. Because such modifications of the disclosed embodiments incorporating the spirit and substance of the invention may occur to persons skilled in the art, the invention should be construed to include everything within the scope of the appended claims and equivalents thereof.

LISTING OF REFERENCE LABELS 1 disc brake
2 brake disc
3 brake caliper
4 carrier mount
5 caliper actuator mounting face
6 brake pad
7 brake caliper pad insertion opening
8 mount horn
9 brake pad abutment surface feature
10 brake pad recessed surface feature
11 surface faces
12 prior mount horn
13 vertical groove
14 transverse groove
15 spring reaction bar
16 caliper bar retaining slot
17 caliper bar retaining tab
18 spring
19 spring tip
20 spring reaction bar raised portion
21 spring reaction bar lowered portion
22 spring reaction bar first end
23 spring reaction bar opposite end
24 spring reaction bar tab receiving slot
25 spring bend
26 brake pad spring receiving slot
27 brake pad spring receiving slot tip
28 brake pad spring reaction bar slot
29 brake wear indicator sensor slot
30 brake application spindles
31 insert elements
32 fastener
33 surface features
34 fastener receiving hole
35 leaf spring tip holes
36 brake pad backing plate spring tip retaining hook
101 brake pad
102 brake pad leading edge
103 brake pad trailing edge

What is claimed is:

1. A brake pad motion suppression system for a disc brake, comprising:
    a brake caliper;
    a brake pad;
    a carrier mount having brake pad abutment surfaces configured to receive the brake pad;
    a brake pad biasing structure,
    wherein
        a lateral side of the brake pad and a brake pad abutment surface of the carrier mount have complementary surface features configured to retain the brake pad in the disc brake in a radially outward direction,
        the brake pad biasing structure biases a face of the surface feature of the brake pad in the radially outward direction against a face of the surface feature of the brake pad abutment surface, and
        the brake pad biasing structure applies a biasing force in the radially outward direction to an upper portion of a backing plate of the brake pad.

2. The brake pad motion suppression system of claim 1, wherein
    the brake pad biasing structure includes at least one spring configured to bias the brake pad in the radially outward direction.

3. The brake pad motion suppression system of claim 2, wherein
    the brake pad biasing structure includes a spring support configured to support the at least one spring when the spring is applying the radially outward biasing force to the brake pad.

4. The brake pad motion suppression system of claim 3, wherein
    the brake pad biasing structure includes a spring reaction bar supported on the brake caliper and supporting the at least one spring.

5. The brake pad motion suppression system of claim 4, wherein
    the surface feature of the brake pad abutment surface is wedge-shaped.

6. The brake pad motion suppression system of claim 4, wherein
    a radially outer surface of the upper portion of the brake pad backing plate includes at least one spring receiving feature configured to cooperate with the at least one spring to bias the brake pad in the radially outward direction.

7. The brake pad motion suppression system of claim 6, wherein the at least one brake pad backing plate spring receiving feature is configured to receive an S-shaped tip of the at least one spring.

8. The brake pad motion suppression system of claim 6, wherein
the at least one brake pad backing plate spring receiving feature is configured to receive a tip of the at least one spring having a spring retaining feature configured to cooperate with a corresponding spring retaining feature of the at least one brake pad backing plate spring receiving feature.

9. The brake pad motion suppression system of claim 8, wherein
the spring retaining feature of the at least one brake pad backing plate spring receiving feature is a hook-shaped protrusion and the spring retaining feature of the tip of the at least one spring is a depression configured to cooperate with the hook-shaped protrusion to inhibit movement of the tip away from the at least one brake pad backing plate spring receiving feature.

10. The brake pad motion suppression system of claim 6, further comprising:
at least one spring insert configured to be located between the spring reaction bar and the at least one spring.

11. The brake pad motion suppression system of claim 10, wherein
at least one of the at least one spring insert and the spring reaction bar is configured increase the radially outward biasing force applied by the at least one spring to the brake.

* * * * *